(12) United States Patent
Shimano et al.

(10) Patent No.: US 7,911,889 B2
(45) Date of Patent: *Mar. 22, 2011

(54) OPTICAL DISC APPARATUS

(75) Inventors: Takeshi Shimano, Yokohama (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,211

(22) Filed: Apr. 5, 2010

(65) Prior Publication Data

US 2010/0188961 A1    Jul. 29, 2010

Related U.S. Application Data

(63) Continuation of application No. 11/746,681, filed on May 10, 2007, now Pat. No. 7,715,287.

(30) Foreign Application Priority Data

May 25, 2006 (JP) .................................. 2006-144744

(51) Int. Cl.
*G11B 7/00* (2006.01)
(52) U.S. Cl. ................................. 369/44.23; 369/112.17
(58) Field of Classification Search ............... 369/44.23, 369/53.28, 112.17, 112.19, 116
See application file for complete search history.

(56) References Cited

U.S. PATENT DOCUMENTS

| | | | |
|---|---|---|---|
| 5,115,420 A | 5/1992 | Finkelstein et al. | |
| 5,745,265 A | 4/1998 | Hasegawa et al. | |
| 5,856,960 A * | 1/1999 | Hwangbo et al. | 369/44.28 |
| 5,859,819 A * | 1/1999 | Miyabe et al. | 369/44.41 |
| 6,181,666 B1 | 1/2001 | Miyazaki et al. | |
| 6,567,366 B2 | 5/2003 | Kim et al. | |
| 7,177,260 B2 | 2/2007 | Kim et al. | |
| 2001/0030861 A1 | 10/2001 | Oda et al. | |
| 2003/0185137 A1 | 10/2003 | Horinouchi et al. | |
| 2007/0165510 A1 | 7/2007 | Yamamoto | |

FOREIGN PATENT DOCUMENTS

| | | |
|---|---|---|
| EP | 0 438 042 | 7/1991 |
| EP | 0 572 981 | 12/1993 |
| JP | 05-135419 | 6/1993 |
| JP | 05-342678 | 12/1993 |
| JP | 06-162552 | 6/1994 |
| JP | 06-223433 | 8/1994 |

* cited by examiner

*Primary Examiner* — Thang V Tran
*Assistant Examiner* — Brenda Bernardi
(74) *Attorney, Agent, or Firm* — Antonelli, Terry, Stout & Kraus, LLP.

(57) ABSTRACT

An optical disc apparatus includes a laser diode, a first optical component which branches beams from the laser diode into a first beam and a second beam, an objective lens which focuses the first beam on an optical information recording medium, an actuator which drives the objective lens in an optical axis direction, a reference mirror provided in an optical path of the second beam, an optical path length varying unit which varies an optical path length of the second beam, a first photo detector, a second photo detector, a second optical component which branches beams obtained by combining the first beam which is reflected by the optical information recording medium and the second beam which is reflected by the reference mirror and which makes the branched beams incident on the first and second photo detectors, and a signal processing part.

9 Claims, 6 Drawing Sheets

TES = (A+B−C−D) + (E+F−G−H)

FES = (A−B−C+D) + (E−F+G−H)

RFS = (A+B+C+D) − (E+F+G+H)

TOT = (A+B+C+D) + (E+F+G+H)

TES = (A+B−C−D) + (E+F−G−H)

FES = (A−B−C+D) + (E−F+G−H)

RFS = (A+B+C+D) − (E+F+G+H)

OPTICAL DISC APPARATUS

CROSS REFERENCE TO RELATED APPLICATION

This application is a continuation of U.S. application Ser. No. 11/746,681, filed May 10, 2007, now U.S. Pat. No. 7,715,287, the contents of which are incorporated herein by reference.

CLAIM OF PRIORITY

The present application claims priority from Japanese application JP 2006-144744 filed on May 25, 2006, the content of which is hereby incorporated by reference into this application.

BACKGROUND OF THE INVENTION

1. Field of the Invention

The present invention relates to a higher signal-to-noise ratio of a read-out signal in an optical disc apparatus.

2. Description of the Prior Art

As to optical discs, a Blu-ray Disc which is read and written by using a blue laser diode and a high NA (Numerical Aperture) objective lens has been commercialized. With this commercialization, it is considered that the optical discs have almost reached its limit in terms of the resolution of its optical system, and that, hereafter, a multi-layer structure in an optical disc is effective in order to further achieve a larger capacity in the optical disc. In a multi-layer optical disc, the amounts of light detected from respective layers need to be approximately the same. Thus, the reflectance from a specific layer has to be kept small. Meanwhile, along with the achievement in an increase of the capacity in the optical disc, a transfer rate has also been continuously increased because of the need to increase a dubbing speed for a video and the like. Accordingly, a sufficient signal-to-noise ratio of a read-out signal becomes less and less likely to be secured without modification. For this reason, a higher signal-to-noise ratio of a detection signal is required to achieve the multi-layer and the higher speed at the same time in the future.

Techniques related to the higher signal-to-noise ratio of a read-out signal of the optical disc are described, for example, in Japanese Patent Application Laid-Open Publications Nos. Hei 5 (1993)-342678, Hei 6 (1994)-223433 or the like. Both of the techniques are related to the higher signal-to-noise ratio of a read-out signal of a magneto-optical disk, and aim to achieve the following. Specifically, light from a laser diode is branched off before irradiation onto an optical disk. Then, light with which the optical disc is not irradiated is combined with and interferes with light reflected from the optical disk. Thus, the amplitude of a weak signal is increased by increasing the amount of the light with which the optical disc is not irradiated. In a case where a differential detection between transmitted light and reflected light is performed by a polarizing beam splitter heretofore used in a signal detection for a magneto-optical disk, the detection is performed essentially in the following manner. Specifically, original incident polarization components are allowed to interfere with polarization components orthogonal to an incident polarization direction. The orthogonal polarization components are generated by polarization rotation of the magneto-optical disk. In this way, the detection is performed by amplifying the orthogonal polarization components with the original incident polarization. Thus, the signal can be amplified by increasing the original incident polarization components. However, in order to prevent deletion and overwriting of data, the intensity of light made incident on the optical disk needs to be suppressed to a certain level or less. In contrast to this, in the conventional techniques described above, the intensity of light allowed to interfere with signal light for signal amplification can be increased regardless of the intensity of light on a surface of the disk in the following way. To be more precise, the light to be allowed to interfere with the signal light is previously separated. Then, the separated light is not collected on the disk, but allowed to interfere with the signal light. Thus, in principle, the more the intensity is increased within the allowable range of the intensity, the more the signal-to-noise ratio can be improved in relation to, for example, the noise of an amplifier which converts a photocurrent from a photo detector into a voltage, or the shot noise caused by the photo detector.

In Japanese Patent Application Laid-Open Publication No. Hei 5 (1993)-342678, two lights are allowed to interfere with each other to detect the interference intensity. In this event, securing of interference signal amplitude is intended by varying an optical path length of disk-nonreflective light to interfere with the other light. In Japanese Patent Application Laid-Open Publication No. Hei 6 (1994)-223433, the differential detection is also performed, in addition to the interference intensity detection. Thus, a higher signal-to-noise ratio is realized by canceling intensity components of the respective lights, which do not contribute to a signal, and by canceling noise components of the lights. For the differential detection in this case, a non-polarizing beam splitter is used.

SUMMARY OF THE INVENTION

Each of the optical systems of interferometers used in the conventional techniques described above is a Mach-Zehnder type optical system, which is not suitable for miniaturization of the optical systems due to a large number of optical parts. Although not described in detail in the foregoing documents, the reason for using the Mach-Zehnder type optical system is assumed to be that, since the signal light of the magneto-optical disk is generated by polarization rotation, a half wave plate, whose rotation can adjust a polarization direction of light causing interference, needs to be arranged in an optical path where the light interference takes place so that the light would pass therethrough not in both directions but only in one direction. Furthermore, as another problem, a method for adjusting an optical path difference between the two lights is not particularly described in the foregoing documents. Thus, it is difficult to put the techniques into practical use. Japanese Patent Application Laid-Open Publication No. Hei 6 (1994)-223433 discloses, as a solution to the problem, that the reference mirror for obtaining light causing interference is disposed so as to separate from the recording film on the disk. However, this solution is intended to propose a new disk standard, and is not intended to achieve a higher signal-to-noise ratio in the existing disk.

In consideration of the conventional techniques described above, it is an object of the present invention to provide an optical disc apparatus including an interference-type optical disk signal detection system, which facilitates the control of an optical path difference between two lights, which has a high signal amplification effect and which is suitable for miniaturization of an optical system.

In order to facilitate the control of the optical path difference, as one aspect of the present invention, the optical system is integrally formed, and the entire optical system is driven relative to a disk in an optical axis direction by autofocus drive. Accordingly, as in the case where only an objective lens is moved by autofocus control, the optical path length in the optical system is no longer changed. Thus, the control range of the optical path difference can be narrowed to facilitate the control thereof. There have heretofore been proposed various optical heads, in each of which the optical system is integrally formed, and which the entire system is driven in a focus direction. However, a fundamental object thereof is not to fix the optical path length, but to facilitate manufacturing thereof by eliminating a focus actuator from a very small optical head. Meanwhile, in the present invention, the optical system is integrated to achieve a higher signal-to-noise ratio in the interference optical system.

By using the Twyman-Green type optical system as the interferometer but not the Mach-Zehnder type, the optical system is miniaturized, and the number of beam splitters is reduced, thereby the costs can be lowered. In the conventional techniques described above, the reason for not using the Twyman-Green type interference optical system is assumed to be because it is required to insert a half wave plate in one-way optical path in order to control a polarization direction of light causing interference with the polarization rotation light on the magneto-optical disk. However, for the optical disks without polarization rotation, such as a phase change optical disk and a Read-Only Memory type optical disc (ROM optical disc) having uneven pits, the Twyman-Green type optical system enables the formation of a smaller optical system. For the formation of the Twyman-Green type optical system, a polarizing beam splitter is used, and quarter wave plates are inserted in both optical paths of the transmission side and the reflection side of the polarizing beam splitter for the initial incident light. Accordingly, both of light reflected from the disk and light reflected from the reference mirror can be obtained without any losses, in principle, to travel toward a second polarizing beam splitter for differential detection. In this event, the polarization directions of the two lights are orthogonal to each other. The two lights cannot interfere with each other as they are. Thus, by use of half wave plates and the like, the lights are made incident so as to be tilted at 45 degrees relative to the main axis direction of the second polarizing beam splitter. Accordingly, the transmitted light and the reflected light are allowed to interfere with each other while aligning polarizations respectively. Thus, the differential signal having detected intensity is set to be a detection signal.

According to the present invention, it is possible to provide, at low cost, an optical disc apparatus including an interference-type optical disk signal detection system, which facilitates control of an optical path difference between two lights, which has a high signal amplification effect, and which is suitable for miniaturization of an optical system.

DESCRIPTION OF THE PREFERRED EMBODIMENTS

With reference to the drawings, embodiments of the present invention will be described below.

With reference to FIGS. 1 to 5, Embodiment 1 that is a basic embodiment of the present invention will be described.

Figure 1:
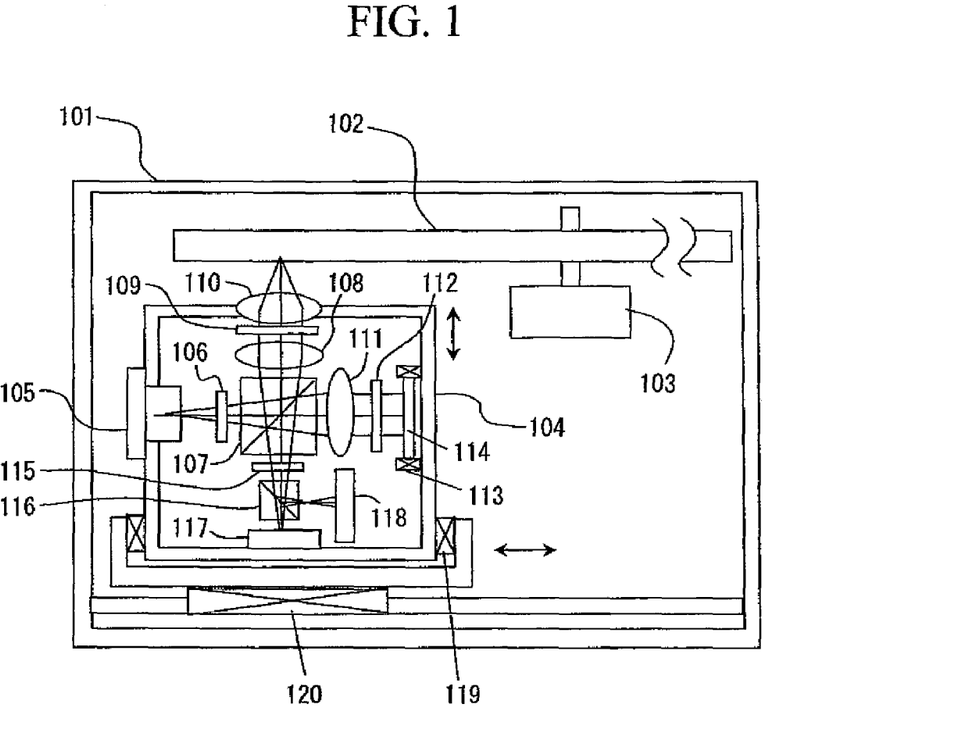
FIG. 1 is a view showing a configuration of an apparatus according to Embodiment 1.

In FIG. 1, an optical disk 102, a spindle motor 103 and an optical head unit 104 which records and reproduces information on and from the optical disk 102 are provided in a case 101 of an optical disc apparatus. The optical head unit 104 can be moved in an optical axis direction for focusing light onto the optical disk and in a radial direction of the disk by a focusing actuator 119 and a tracking actuator 120, respectively. In the optical head unit 104, a laser diode 105 is provided, and the emitted light therefrom has its polarization direction rotated by a half wave plate 106, and is made incident on a polarizing beam splitter 107. In the polarizing beam splitter 107, the S-polarization component is reflected, and the P-polarization component is transmitted. The reflected S-polarization component is set to be parallel light by a collimator lens 108, is converted into circular polarization by a quarter wave plate 109, and is focused onto a recording film on the optical disk by an objective lens 110. The reflected light is made incident again on the objective lens 110, is converted, when transmitted again through the quarter wave plate 109, into linear polarization of which polarization direction is rotated 90 degrees from that at the time of incidence, and is transmitted through the polarizing beam splitter 107. Meanwhile, the P-polarization component transmitted first through the polarizing beam splitter 107 is set to be parallel light by a second collimator lens 111, is converted into circular polarization by a second quarter wave plate 112, and is reflected by a reference mirror 114 mounted on optical path length varying means 113. Thereafter, the reflected light is made incident again on the quarter wave plate 112, is converted into linear polarization of which polarization direction is rotated 90 degrees from that of the first incident light, and is reflected by the polarizing beam splitter 107. As the optical path length varying means 113, a device capable of controlling a minute displacement, such as a piezoelectric device, may be used. Accordingly, the return light reflected from the optical disk 102 and the return light reflected from the reference mirror 114 are generated, and made incident on a second half wave plate 115. Thereafter, the linear polarization directions of the respective lights are rotated 45 degrees, and the lights are made incident on a second polarizing beam splitter 116. Subsequently, the light of the P-polarization component is transmitted through a separation plane of the second polarizing beam splitter, and is made incident on a first photo detector 117. Moreover, the light of the S-polarization component is reflected by the separation plane, and is made incident on a second photo detector 118.

Figure 2:
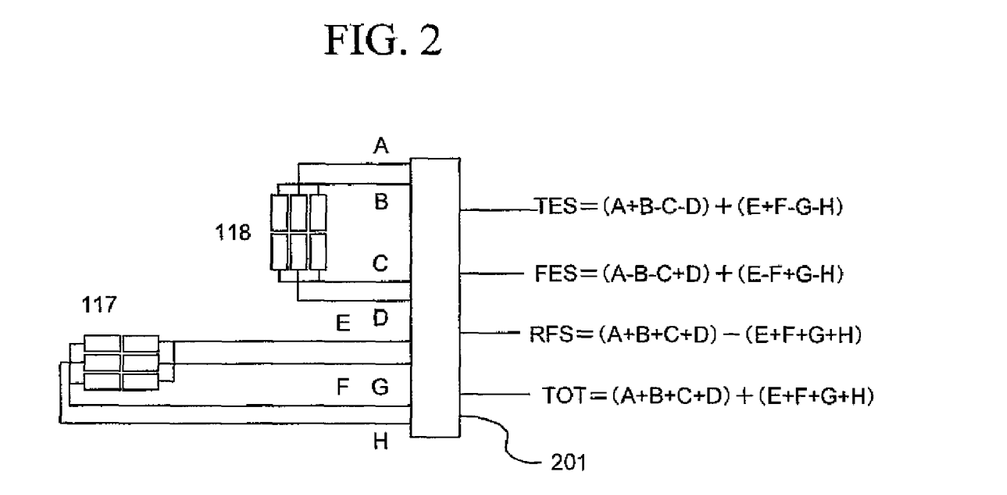
FIG. 2 is a view showing a photo detector pattern and a signal computation method.

FIG. 2 shows a method for calculating output signals from the photo detectors. Each of the photo detectors 117 and 118 has six divided light detecting parts. When the output signals from those light detecting parts are indicated by A to H as shown in FIG. 2, a signal arithmetic circuit 201 outputs a tracking error signal TES, a focus error signal FES and a read-out radio frequency signal RFS. A spot-size method is used for focus error detection, and a push-pull method is used for tracking detection. The focus error signal and the tracking error signal are amplified, and fed back to the focusing actuator 119 and the tracking actuator 120 in FIG. 1, respectively. Thus, closed-loop control is executed. A method for driving the optical path length varying means 113 will be described later.

Figure 3:
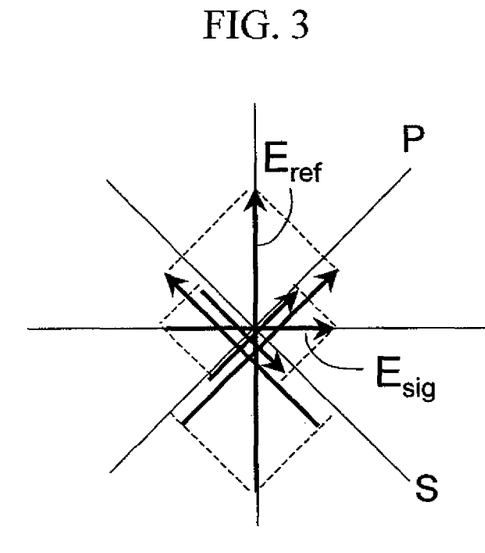
FIG. 3 is a view showing polarization directions of signal light and reference light and a polarization direction of detection light.

The read-out radio frequency signal RFS is basically a differential signal for a total amount of light received by the photo detectors 117 and 118. The reason whey the read-out radio frequency signal can be detected by the photo detectors will be described below. In FIG. 1, when it is assumed that the electric field amplitude of the light reflected from the optical disk 102, which is made incident on the polarizing beam splitter 116, is $E_{sig}$, and that the electric field amplitude of the light reflected from the reference mirror 114 is $E_{ref}$, the $E_{sig}$ and the $E_{ref}$ are set to be electric field vectors orthogonal to each other as indicated by polarization directions in FIG. 3. This is obvious from the facts that the light reflected from the optical disk 102 is transmitted through the polarizing beam splitter 107 (corresponding to P polarization), and that the light reflected from the reference mirror 114 is reflected by the polarizing beam splitter 107 (corresponding to S polarization). Meanwhile, before the lights are made incident on the second polarizing beam splitter 116, the polarization directions thereof are rotated 45 degrees by the second half wave plate 115. Thus, as shown in FIG. 3, the specific polarization directions P and S of the second polarizing beam splitter 116 have axes tilted 45 degrees from the incident polarizations, respectively. In this event, it is found out that the total sum of polarization components of the respective incident lights transmitted through and reflected by the second polarizing beam splitter is a combination of components obtained by projecting the vectors $E_{sig}$ and $E_{ref}$ in the P axis and the S axis directions in FIG. 3, respectively, in which each of the components is obtained, from the directions of the respective arrows, as a sum of $E_{sig}$ and $E_{ref}$ in the case of the P axis and as a difference between $E_{sig}$ and $E_{ref}$ in the case of the S axis. Specifically, the transmitted light intensity $I_{PD1}$ of the second polarizing beam splitter 116 is obtained by the following equation (1), and the reflected light intensity $I_{PD2}$ thereof is obtained by the following equation (2).

$$I_{PD1} = \left| \frac{1}{\sqrt{2}} E_{sig} + \frac{1}{\sqrt{2}} E_{ref} \right|^2 \quad (1)$$
$$= \frac{1}{2}|E_{sig}|^2 + \frac{1}{2}|E_{ref}|^2 + |E_{sig}||E_{ref}|\cos(\varphi_{sig} - \varphi_{ref})$$

$$I_{PD2} = \left| \frac{1}{\sqrt{2}} E_{sig} - \frac{1}{\sqrt{2}} E_{ref} \right|^2 \quad (2)$$
$$= \frac{1}{2}|E_{sig}|^2 + \frac{1}{2}|E_{ref}|^2 - |E_{sig}||E_{ref}|\cos(\varphi_{sig} - \varphi_{ref})$$

Therefore, the differential signal is expressed by the following equation (3). Here, $\phi_{sig}$ and $\phi_{ref}$ are phases of the respective lights.

$$I_{PD1} - I_{PD2} = 2|E_{sig}||E_{ref}|\cos(\phi_{sig} - \phi_{ref}) \quad (3)$$

Therefore, it is found out that a signal to be detected is proportional to a value obtained by multiplying the absolute value of the signal light $E_{sig}$ by the absolute value of the reference light $E_{ref}$. Thus, the signal amplitude can be increased by increasing the amount of reference light allowed to interfere without changing the amount of light made incident on the optical disk 102. However, it is also obvious that, when a phase difference between the signal light and the reference light is changed, the amplitude is changed in proportion to a cosine value thereof. Thus, it is clear that control of the optical path difference between the two lights is required for the signal amplification. Furthermore, in the case where only the intensity of the signal light is detected as in the normal case without using the present method, the intensity is set to $|E_{sig}|^2$, and thus the signal amplification ratio can be expressed as in the following equation (4).

$$\frac{I_{PD1} - I_{PD2}}{|E_{sig}|^2} = 2\frac{|E_{ref}|}{|E_{sig}|}\cos(\varphi_{sig} - \varphi_{ref}) \quad (4)$$
$$= 2\sqrt{\frac{I_{ref}}{I_{sig}}}\cos(\varphi_{sig} - \varphi_{ref})$$

Specifically, in order to double the signal amplitude with the same signal light intensity as that of the conventional case, the reference light intensity should be set the same as the signal light intensity. When the reference light intensity is set four times that of the signal light, the signal amplitude is also quadrupled. If the reference light intensity is n times that of the signal light, the signal amplitude is set 2√n times the original amplitude. Meanwhile, the direct current light intensity components, which do not contribute to the signal, are cancelled by the differential detection. Accordingly, the noise attributable to the intensity is reduced compared with that in the normal detection. Thus, the signal-to-noise ratio is improved more than a signal amplification factor.

Although the polarizing beam splitter 116 in FIG. 1 is a device having a cubic shape, the shape thereof is not limited to the above as long as the same polarizing separation function is realized. For example, the same function can be easily realized by use of a polarizing diffraction grating or the like using a birefringent crystal, a liquid crystal material and the like. In this case, the photo detectors 117 and 118 can share the light detecting surface, which is effective in miniaturization of the optical system.

Figure 4:
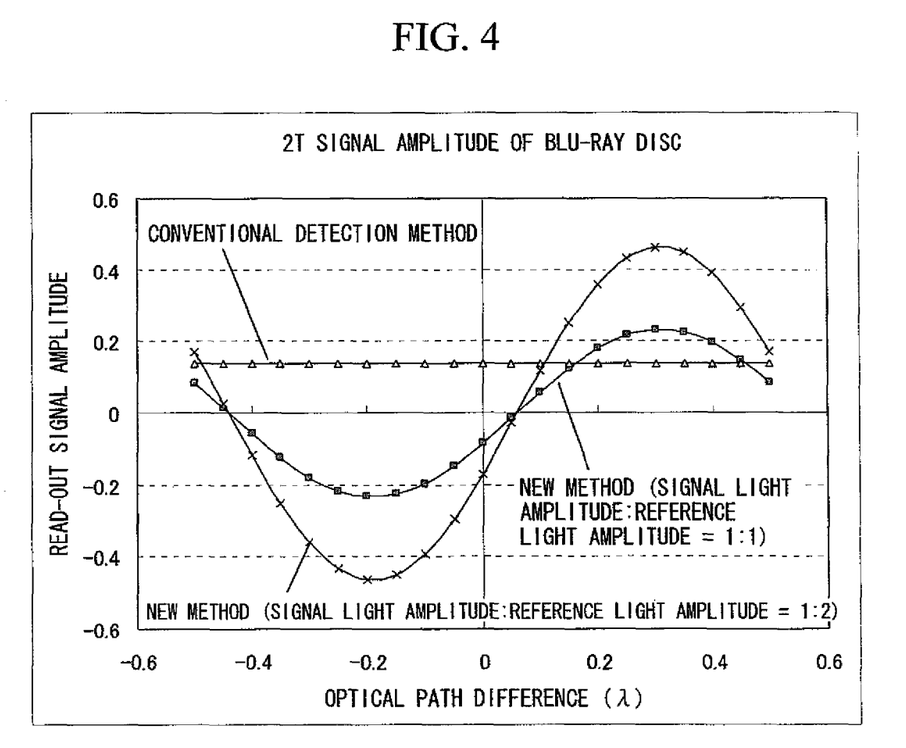
FIG. 4 is a graph showing results of a signal amplification simulation in Embodiment 1.

FIG. 4 is a graph comparing the signal amplitude simulation results in the case where recording mark arrays on a Blu-ray Disc are reproduced by use of the method of the present invention with those in the case where the recording mark arrays are reproduced by use of a conventional detection method for detecting a total amount of light. Specifically, in the recording mark arrays, shortest recording marks (2T) and shortest spaces (2T) are repeated. The horizontal axis indicates the optical path difference between the signal light and the reference light by a unit of wavelength (λ), and the vertical axis indicates the signal amplitude by an arbitrary unit. The negative signal amplitude indicates that, when an optical spot is focused on the recording mark, the signal level is reduced by use of the conventional method, but is increased by use of the method of the present invention. Specifically, the negative signal amplitude indicates a state where a signal polarity is inverted. The methods of the present invention are in the cases where the amplitude ratio of the signal light to the reference light (square root of an intensity ratio) is 1:1, and where the ratio is 1:2. It is found out from FIG. 4 that, when the amplitude ratio is 1:1 (the intensity ratio is 1:1), as predicted by the analytic formula described above, the signal amplitude about twice as large as that in the conventional method can be obtained by controlling the optical path difference. Moreover, it is found out that, when the amplitude ratio is 1:2 (the intensity ratio is 1:4), the signal amplitude about four times as large as that in the conventional method and about twice as large as that in the case where the amplitude ratio is 1:1 is obtained.

From the above results, it is found out that, in order to obtain the signal amplitude larger than that in the conventional method, it is required to control the optical path difference with accuracy equivalent to about 1/10 of the wavelength. Thus, first, by roughly comparing a signal polarity in the conventional detection method with that in the method of the present invention, a phase range within which signals having the same polarity can be obtained is defined. The signals obtained by the conventional detection method can be detected by a total light amount signal (TOT) shown in FIG. 2. By use of the equations (1) and (2), the TOT can be expressed as in the following equation (5). It is obvious that $|E_{ref}|^2$ is added to the original $|E_{sig}|^2$ that is the conventional detection signal.

$$I_{PD1} + I_{PD2} = \frac{1}{2}|E_{sig}|^2 + \frac{1}{2}|E_{ref}|^2 \quad (5)$$

However, since the above signal has a certain amount of direct current components, the signal can be removed by use of an electrical low-pass filter. A phase comparison circuit is used to search and obtain an optical path difference at which a read-out radio frequency signal is set maximum within a range where the polarity of the signal light is equal to that of the signal described above.

Figure 5:
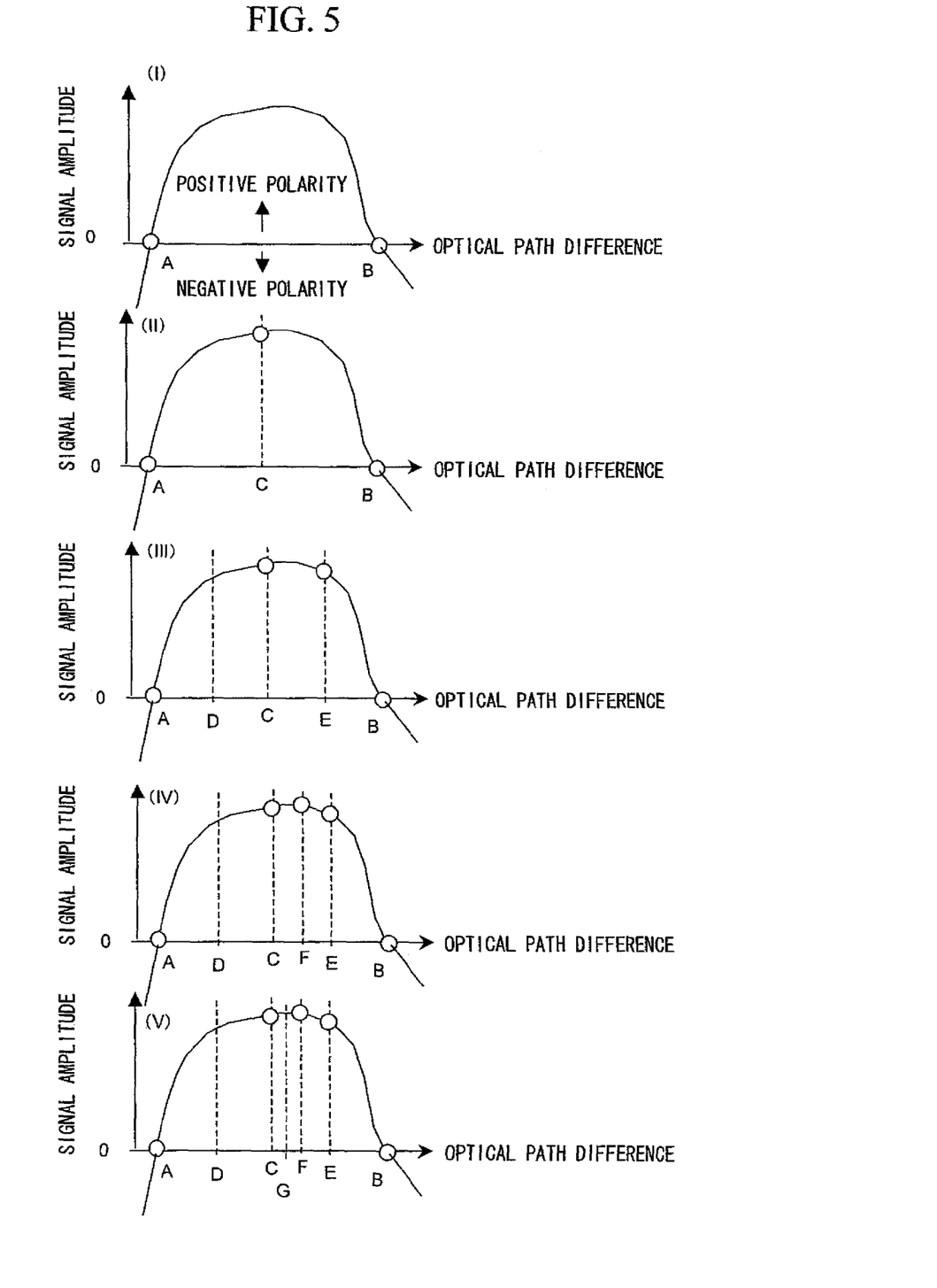
FIG. 5 is graphs showing an optical path difference searching method for realizing the maximum signal amplitude in Embodiment 1.

With reference to FIG. 5, a specific search flow will be described.
(I) By checking the signal polarity while moving the optical path length varying means 113 shown in FIG. 1, an optical path difference A at which the polarity is inverted from the negative polarity to the positive polarity is stored in a memory. Thereafter, by further moving the optical path difference in the same direction, a position B where the polarity is set back to the negative polarity is stored in the memory.
(II) The signal amplitude is obtained at this intermediate optical path difference C, and is stored in the memory together with the optical path difference.
(III) Furthermore, the amplitudes are obtained at intermediate points D and E between the optical path difference C and the optical path differences A and B, respectively. The optical path difference at which the amplitude is larger (here, the optical path difference E) and the amplitude are stored in the memory.
(IV) Furthermore, the amplitude is obtained at an intermediate optical path difference F between the optical path difference E and the original intermediate point C.
(V) Subsequently, the amplitude is obtained at an intermediate point G between the point F and the point having larger amplitude (here, C) between the points C and E on the both sides of the point F.

After the above flow is repeated, when an increment from the value at the intermediate point and the value at the original intermediate point is equal to a certain set value or less, the value is set as the maximum value, and the search is finished. Thus, setting of the position of the reference mirror 114, in other words, setting of the optical path difference between the signal light and the reference light, by use of the optical path length varying means 113 is finished. As the signals, ROM pit information previously recorded on the disk, prewritten phase-change marks, and the like may be used.

The position of the reference mirror 114 may be set once at the time of assembly of the optical head as described above. Thus, basically, the optical path length varying means 113 is supposed to be no longer required. However, in consideration of a change in the optical path length due to a temperature change, securing for an initial control error, and the like, it is preferable to actually install the optical path length varying means 113.

Figure 6:
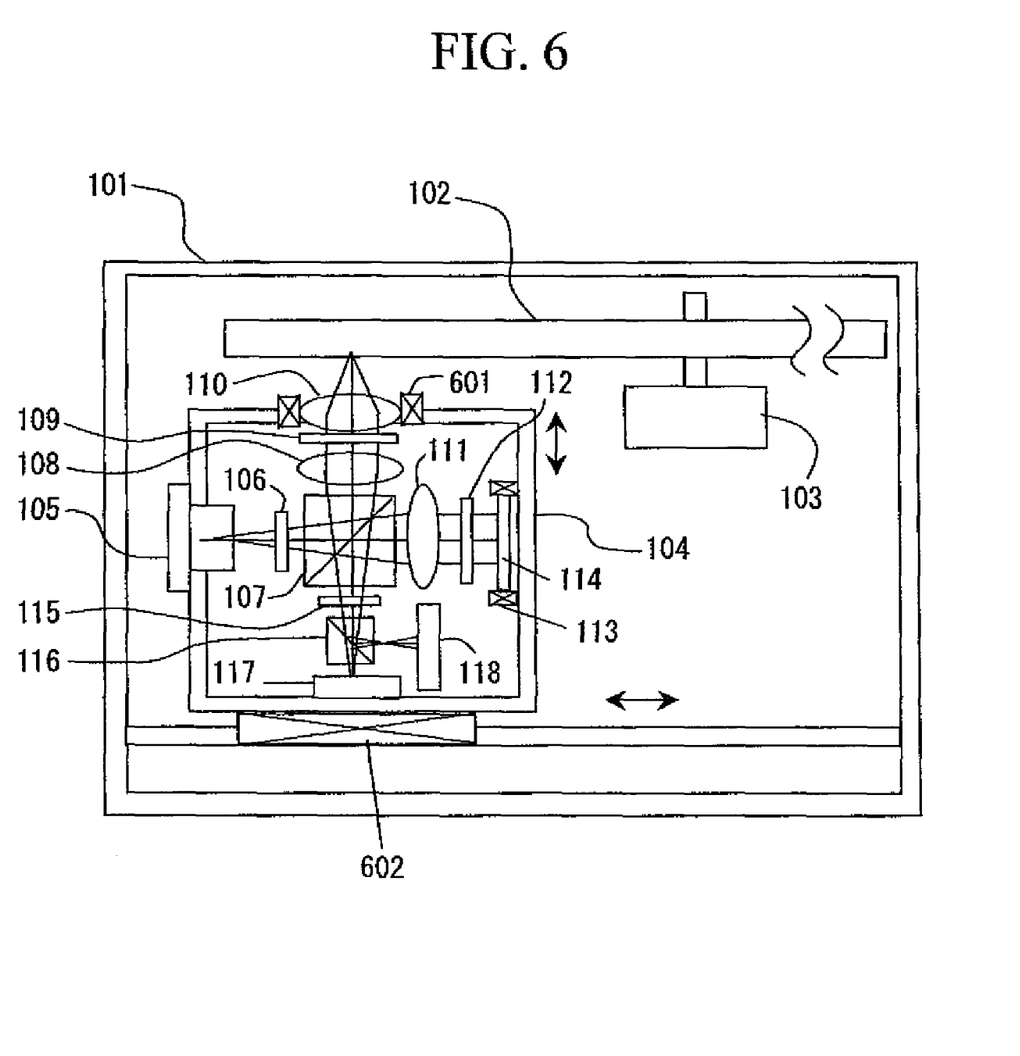
FIG. 6 is a view showing a configuration of an apparatus according to Embodiment 2.

With reference to FIG. 6, Embodiment 2 of the present invention will be described. In Embodiment 1, the optical system is integrally miniaturized, and the entire optical system is mounted on the focus actuator and moved. Moreover, the optical path length varying means 113 shown in FIG. 1 is controlled by searching the maximum value of the signal amplitude. However, in reality, from the viewpoint of manufacturing costs and the like, the present invention is effective even if the optical system cannot be miniaturized. In such a case, only the objective lens is mounted on the focus tracking actuator.

With reference to FIG. 6, the configuration of an optical head in this embodiment will be described. Here, the objective lens 110 is mounted on a two-dimensional actuator 601, and driven in a focus direction and a tracking direction. In the focus direction drive, the focus error signal FES described with reference to FIG. 2 is amplified by a differential amplifier and fed back. In the tracking direction drive, the tracking error signal TES is similarly amplified and fed back. Thus, closed-loop control is executed. In this event, in the case of reproduction of a disk having no cover layer or in the case where, even if the disk has the cover layer, the variation in the thickness thereof is very small, the optical path difference between the return light focused on and reflected by the disk 102 and the return light reflected by the reference mirror 114 is changed for the movement amount of the lens by driving the lens in the focus direction. Therefore, in such a case, the movement amount of the reference mirror 114 may be set the same as that of the objective lens 110. Thus, the drive signal in the focus direction of the two-dimensional actuator 601 may be basically directly fed back to the optical path length varying means 113.

In this embodiment, the initial position of the reference mirror 114 is set by the optical path length varying means 113 so as to allow the read-out radio frequency signal to have the same signal polarity as that of signals obtained by adding the output signal of the first photo detector 117 and the output signal of the second photo detector 118 and to have the maximum signal amplitude.

As a matter of course, in the case of such a disk substantially having no cover layer, basically, the optical path length varying means 113 is supposed to be no longer required if the integral optical head can be used as in the case of Embodiment 1. However, in consideration of a change in the optical path length within the optical head due to a temperature change, securing for an initial control error, and the like, the optical head having the same configuration as that shown in FIG. 1 is considered to be actually required in this case also.

Figure 7:
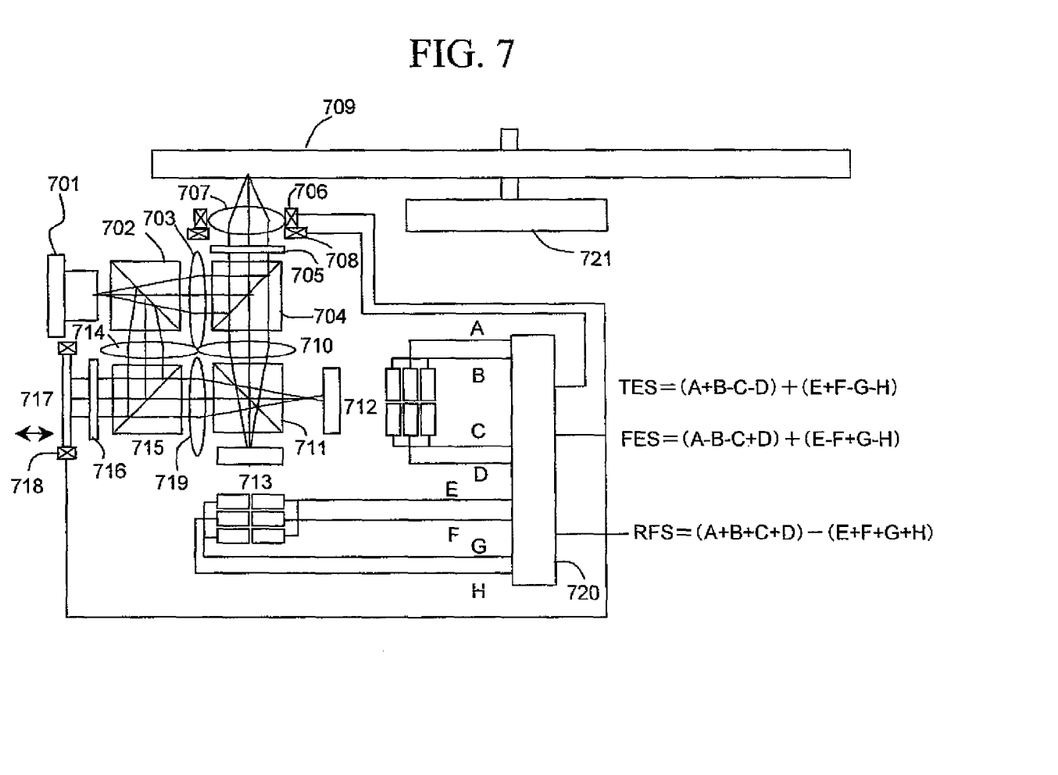
FIG. 7 is a view showing a configuration of an apparatus according to Embodiment 3.

With reference to FIG. 7, Embodiment 3 of the present invention will be described. In this embodiment, not the Twyman-Green type but the Mach-Zehnder type optical system is used. Light emitted from a laser diode 701 is divided into two lights by a non-polarizing beam splitter 702. One of the lights is transmitted toward an optical disk 709, and the other light is reflected toward a reference mirror 717. A ratio of division of the light by the non-polarizing beam splitter 702 is not limited to 1:1. The amount of light traveling toward the reference mirror is set larger for signal amplification. The light traveling toward the optical disk 709 is set to be parallel light by a collimator lens 703, is reflected by a polarizing beam splitter 704, is converted into circular polarization by a quarter wave plate 705, and is focused on the optical disk 709 by an objective lens 707 which is mounted on a focusing actuator 706 and a tracking actuator 708. The reflected light is returned to the objective lens 707, is converted into linear polarization orthogonal to the direction of incidence by the quarter wave plate 705, and is transmitted through the polarizing beam splitter 704. The transmitted light is converted into a converged beam by a condenser lens 710, and is divided into reflected light and transmitted light by a non-polarizing half beam splitter 711 to travel toward respective photo detectors 712 and 713.

Meanwhile, the light first reflected by the non-polarizing beam splitter 702 is set to be parallel light by a collimator lens 714, is reflected by a polarizing beam splitter 715, is converted into circular polarization by a quarter wave plate 716, and is reflected by the reference mirror 717 mounted on an optical path length varying device 718. As the optical path length varying device, for example, a piezoelectric device or the like may be used. The light reflected by the reference mirror 717 is transmitted through the polarizing beam splitter 715, is converted into a converged beam by a condenser lens 719, and is divided into transmitted light and reflected light by the non-polarizing half beam splitter 711. The transmitted light overlaps with the reflected light divided by the non-polarizing half beam splitter 711 among the reflected lights from the optical disk 709, and the interference intensity is detected by the photo detector 712. The light reflected by the condenser lens 719 overlaps with the transmitted light divided by the non-polarizing half beam splitter 711 among the reflected lights from the optical disk 709, and the interference intensity is detected by the photo detector 713.

In Embodiment 1, the beam splitter which finally allows the reflected light from the optical disk and the reference light to interfere with each other, and which separates the both, is the polarizing beam splitter. Meanwhile, here, Embodiment 3 is different from Embodiment 1 in that the beam splitter described above is the non-polarizing half beam splitter 711. Specifically, while the polarization directions of the two lights allowed to interfere with each other are orthogonal to each other in Embodiment 1, the polarization directions thereof are basically set the same in this embodiment.

As described in Embodiment 1 with reference to FIG. 3, as for the total sum of the polarization components of the transmitted light and the reflected light obtained by the beam splitter, one is the sum of amplitudes of the two lights, and the other is the difference therebetween. Meanwhile, also in this embodiment where the polarization directions are aligned, the same effect is achieved by use of the non-polarizing half beam splitter. Specifically, in the case where light is reflected on the reflection surface in the center of the beam splitter, a reflection action is basically caused by a difference in refractive indices between media on both sides of the reflection surface. In this event, when it is assumed that the refractive indices of the two media are n1 and n2, the amplitude reflectance in the case where the light is to travel from n1 toward a boundary of n2 is expressed as $(n2-n1)/(n2-n1)$. On the other hand, the amplitude reflectance in the case where the light is to travel from n2 toward a boundary of n1 is symmetrically expressed as $(n1-n2)/(n1+n2)$. Therefore, the phase is always shifted by 180 degrees between the case where the reflected light from the disk is reflected and the case where the reflected light from the reference mirror is reflected. As to the transmission, there is no phase shift caused in a boundary surface for the both lights. Thus, as to the signals detected by the photo detectors 712 and 713, one of the signals turns out to be a sum of complex amplitudes of the two lights, and the other signal turns out to be a difference therebetween. Besides the above, exactly the same relational expression as that described by use of the equations in Embodiment 1 is established.

Calculation of a reception signal of light detected is exactly the same as that described with reference to FIG. 2 in Embodiment 1. Thereafter, the focus error signal is fed back to the focusing actuator 706, and the tracking error signal is fed back to the tracking actuator 708. In this event, an optical path length from the optical disk to the detector is changed by driving the objective lens in the optical axis direction by a focus servo. Thus, the focus error signal FES is also fed back to the optical path length varying device 718 so as to also move the reference mirror 717 for the same optical path length in conjunction with the objective lens.

Figure 8:
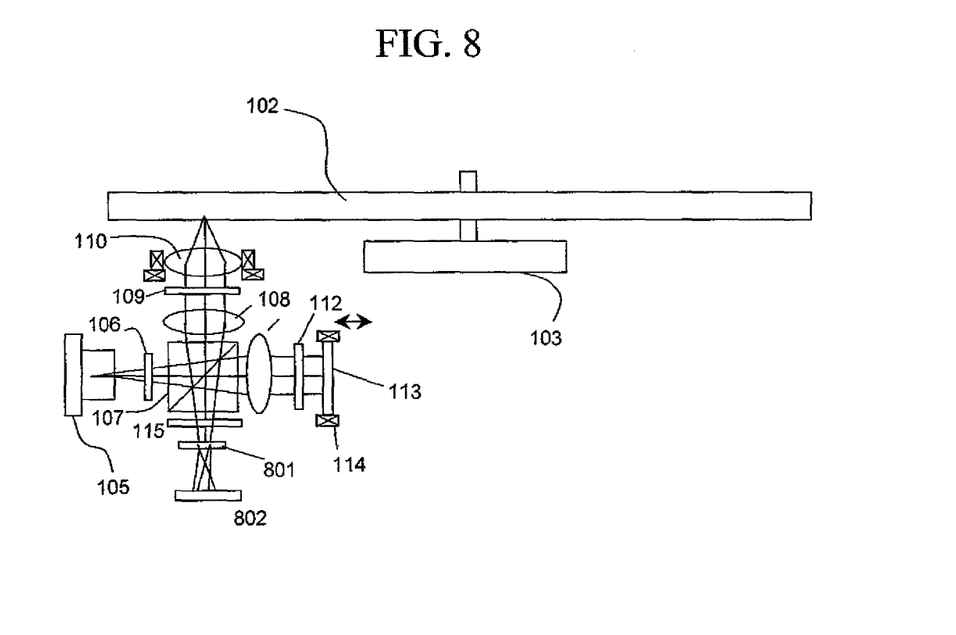
FIG. 8 is a view showing a configuration of an apparatus according to Embodiment 4.

With reference to FIG. 8, Embodiment 4 of the present invention will be described. A basic configuration of this embodiment is the same as that of Embodiment 2 shown in FIG. 6. However, a polarizing diffraction grating 801 is used as the polarizing beam splitter for performing polarizing separation at the end. Thus, the optical system is miniaturized by integrating photo detectors into an integral photo detector 802. While two photo detectors are used in FIGS. 1, 6 and 7, the photo detectors can be integrated into one photo detector by utilizing the polarizing diffraction grating 801.

Figure 9:
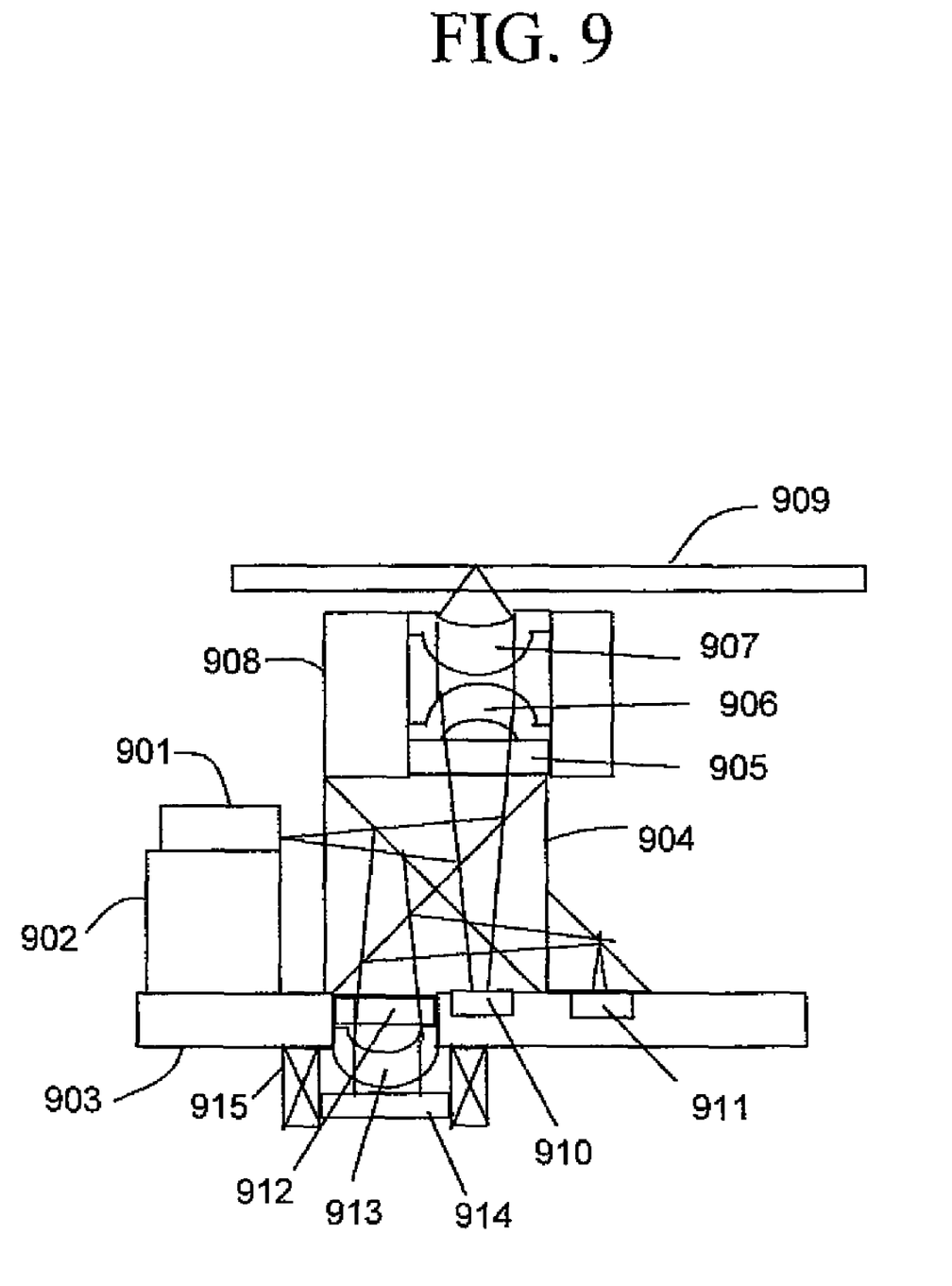
FIG. 9 is a view showing a configuration of an optical system in an optical head according to Embodiment 5.

With reference to FIG. 9, Embodiment 5 of the present invention will be described. A laser diode chip 901 is placed on a SIC sub-mount 902 mounted on a silicon substrate 903. Light from the laser diode chip is separated into two lights by a first separation surface of a compound prism 904. One of the lights travels toward an optical disk 909 and the other travels toward a reference mirror 914. The first separation surface of the compound prism is a non-polarizing beam splitter. Moreover, as to a separation ratio of the lights, an amount of the light traveling toward the reference mirror 914 is set larger. The light traveling toward the optical disk 909 is reflected by a second separation surface corresponding to a polarizing beam splitter, and is transmitted through a quarter wave plate 905. The transmitted light is set to be parallel light by a collimator lens 906 and is focused on the optical disk by an objective lens 907. The quarter wave plate 905, the collimator lens 906 and the objective lens 907 are held by a lens mount 908. The reflected light is returned through the same optical path and is transmitted through the second separation surface while having its polarization rotated 90 degrees from that at the time of incidence. Thereafter, the transmitted light is separated into a transmitted light and a reflected light by a third separation surface corresponding to a non-polarizing half beam splitter.

Meanwhile, the light reflected by the first separation surface is transmitted through a fourth separation surface corresponding to a polarizing beam splitter, is converted into circular polarization by a quarter wave plate 912, is converted into parallel light by a collimator lens 913, and is reflected by the reference mirror 914. In this event, the quarter wave plate 912 and the collimator lens 913 are mounted in a hole formed in the silicon substrate 903 by etching. The reference mirror 914 is formed on a MEMS actuator 915, and an optical path length of reference light is controlled by use of the control method described in Embodiment 1. The light reflected by the reference mirror 914 is returned through the same optical path, and the polarization direction thereof is rotated 90 degrees from that at the time of incidence by the quarter wave plate 912. Thereafter, the light is reflected by the fourth separation surface and is separated into a transmitted light and a reflected light by the third separation surface. The respective lights overlap with the reflected light and the transmitted light of the light reflected from the optical disk 909, and interference intensities thereof are detected by photo detectors 911 and 910 provided on the silicon substrate 903. The entire optical system is integrally formed and is mounted on a two-dimensional actuator for focusing and tracking. For such a type of optical head, a swing arm type actuator as well as a wire suspension type two-dimensional actuator, which has heretofore been widely used for optical disks, may be used. The processing of detection signals is the same as that described with reference to FIGS. 1 and 2 in Embodiment 1.

As described above, according to the present invention, by allowing reference light more intense than signal light to interfere with the signal light, a higher signal-to-noise ratio can be realized, which makes it possible to respond to a multi-layer of an optical disk and a higher speed.

According to the present invention, it is possible to realize an optical disc apparatus which enables a higher signal-to-noise ratio of a read-out signal of an optical disk and realizes a multi-layer optical disk and a higher transfer rate.

What is claimed is:

1. An optical disc apparatus comprising:
   a laser diode;
   a first optical component which branches beams from the laser diode into a first beam and a second beam;
   an objective lens which focuses the first beam on a recording film surface of an optical information recording medium, and which detects the reflected beam;
   an actuator which drives the objective lens in an optical axis direction;
   a reference mirror provided in an optical path of the second beam;
   an optical path length varying means which varies an optical path length of the second beam by moving a position of the reference mirror;
   a first photo detector;
   a second photo detector;
   a second optical component which branches beams obtained by combining the first beam reflected by the optical information recording medium and the second beam reflected by the reference mirror, and which makes the branched beams incident on the first and second photo detectors; and
   a signal processing part which generates a read-out radio frequency signal from an output signal of the first photo detector and an output signal of the second photo detector.

2. An optical disc apparatus comprising:
   a laser diode;
   a first optical component which branches beams from the laser diode into a first beam and a second beam;
   an objective lens which focuses the first beam on a recording film surface of an optical information recording medium, and which detects the reflected beam;
   an actuator which drives the objective lens in an optical axis direction;
   a reference mirror provided in an optical path of the second beam;
   an optical path length varying means which varies an optical path length of the second beam by moving a position of the reference mirror;
   a first photo detector;
   a second photo detector;
   a second optical component which branches beams obtained by combining the first beam reflected by the optical information recording medium and the second beam reflected by the reference mirror, which makes the branched beams incident on the first and second photo detectors;
   a signal processing part which generates a read-out radio frequency signal from an output signal of the first photo detector and an output signal of the second photo detector; and
   means that generates a focus error signal from at least the first beam, wherein the actuator and the optical path length varying means are simultaneously feedback controlled using at least the focus error signal.

3. The optical disc apparatus according to claim 2, wherein the first beam reflected by the optical information recording medium and the second beam reflected by the reference mirror are combined by the first optical component.

4. The optical disc apparatus according to claim 2, wherein the first and second optical components are polarizing optical branching elements.

5. The optical disc apparatus according to claim 4, wherein quarter wave plates are provided between the first optical component and the objective lens, and between the first optical component and the reference mirror, respectively.

6. The optical disc apparatus according to claim 5, wherein half wave plates are provided between the laser diode and the first optical component, and between the first optical component and the second optical component, respectively.

7. The optical disc apparatus according to claim 1, wherein the second optical component is a polarizing diffractive optical element, and the first and second photo detectors are integrally formed.

8. The optical disc apparatus according to claim 1, wherein the first and second optical components are non-polarizing beam splitters,
   the apparatus further comprising:
   a first polarizing beam splitter disposed between the first optical component and the objective lens;
   a quarter wave plate disposed between the first polarizing beam splitter and the objective lens;
   a second polarizing beam splitter disposed between the first optical component and the reference mirror; and
   a quarter wave plate disposed between the second polarizing beam splitter and the reference mirror.

9. The optical disc apparatus according to claim 1, wherein an intensity of the second beam is larger than an intensity of the first beam.

* * * * *